United States Patent [19]

Vora

[11] Patent Number: 4,933,132
[45] Date of Patent: Jun. 12, 1990

[54] PROCESS OF MAKING A SHAPED ARTICLE FROM INTERMEDIATE MOLECULAR WEIGHT POLYIMIDES

[75] Inventor: Rohitkumar H. Vora, Westfield, N.J.

[73] Assignee: Hoechst Celanese Corp., Somerville, N.J.

[21] Appl. No.: 317,170

[22] Filed: Feb. 28, 1989

[51] Int. Cl.$^5$ .................. B29C 43/02; C08G 69/26
[52] U.S. Cl. ..................... 264/331.14; 264/331.19; 264/331.21; 528/183; 528/185; 528/188; 528/191; 528/353
[58] Field of Search .............. 264/237, 331.11, 331.14, 264/331.19, 331.21; 438/473.5; 528/179, 182, 183, 185, 188, 191, 207, 208, 351, 353

[56] References Cited

U.S. PATENT DOCUMENTS

| 3,234,181 | 2/1966 | Olivier | 528/182 |
| 3,356,648 | 12/1967 | Rogers | 528/353 |
| 3,391,120 | 2/1968 | Fritz | 528/179 X |
| 3,959,350 | 5/1976 | Rogers | 528/185 |
| 4,276,407 | 6/1981 | Bilow et al. | 528/183 X |
| 4,477,648 | 10/1984 | Jones et al. | 528/185 |
| 4,569,988 | 2/1986 | Scola et al. | 528/353 |
| 4,631,335 | 12/1986 | Scola et al. | 528/353 |
| 4,645,824 | 2/1987 | Landis et al. | 528/353 |
| 4,692,205 | 8/1987 | Sachdev et al. | 428/473.5 X |
| 4,742,152 | 5/1988 | Scola | 528/353 |
| 4,801,682 | 1/1989 | Scola | 528/353 |

FOREIGN PATENT DOCUMENTS

| 58-180530 | 10/1983 | Japan | 528/185 |
| 61-240223 | 10/1986 | Japan | 528/185 |
| 62-256832 | 11/1987 | Japan | 528/185 |

Primary Examiner—Jeffery Thurlow
Assistant Examiner—Leo B. Tentoni
Attorney, Agent, or Firm—Perman & Green

[57] ABSTRACT

The present invention provides a process for preparing shaped articles and articles prepared by such process based on a polyimide polymer, the polymer prepared by subjecting a mixture of aromatic dianhydride and aromatic diamine monomers, at least one of which contains the group

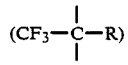

linking two aromatic moieties, wherein R is $CF_3$ or phenyl, to a low temperature, substantially isothermal solution polymeriazation process wherein the content of the mixed monomers in solvent is maintained within the range of from about 8 to about 12% by weight solids concentration during the polymerization process. The process is conducted for a sufficient length of time and uniformity of temperature, generally below about 35° C., to achieve a weight average polyimide polymer molecular weight within the range of about 80,000 to about 135,000, more preferably of about 90,000 to about 125,000, a polyimide inherent viscosity within the range of from about 0.45 to about 0.70, and a polydispersity with the range of from about 1.7 to about 2.6.

13 Claims, No Drawings

PROCESS OF MAKING A SHAPED ARTICLE FROM INTERMEDIATE MOLECULAR WEIGHT POLYIMIDES

This application is related to copending applications Ser. Nos. 317,169 and 317,158, both filed on even date herewith.

BACKGROUND OF THE INVENTION

1. Field of the Invention

The present invention relates to aromatic polyimides containing the hexafluoroisopropylidene group or the 1-phenyl-2,2,2-trifluoroethane group and having an intermediate molecular weight, and to a method for their preparation.

2. Description of Related Art

Polyimides in general are well known in the art to be useful for high temperature applications, since they have a glass transition temperature of about 300 degrees Celsius and above. Such polymers may be prepared in any number of ways, perhaps the most common method being a two-step process including reacting a dianhydride such as pyromellitic dianhydride (PMDA) with a diamine to form a soluble polyamic acid which is then cyclized, thermally or by chemical means to form a polyimide.

Such procedures have been employed in connection with the preparation of fluorinated polyimides as shown, for example, in U.S. Pat. No. 3,356,648 to Rogers. Example 11 of the '648 patent discloses a method of preparing a polyimide from 2,2-bis(3,4-dicarboxyphenyl) hexafluoropropane dianhydride and 2,2-bis(4-aminophenyl) hexafluoro- propane. Equimolar amounts of the diamine and dianhydride are stirred together in dioxane for about eighteen hours at room temperature to form a polyamic acid. To the polyamic acid is added acetic anhydride and a minor amount of beta-picoline. After stirring for about 15 minutes, without cooling, the mixture is poured onto a glass plate to form a gel film. The gel film is heated in an oven at 120° C. for twelve hours, then heated two more hours at 250° C. to form a polyimide film. The polyimide film thus produced is reportedly soluble in chloroform, benzene, dioxane and acetone.

Other fluorinated polyimides are disclosed in U.S. Pat. No. 3,959,350 to Rogers. In Example I of the '350 patent, a fluorinated polyimide is prepared by mixing equimolar amounts of the 2,2-bis(3,4-dicarboxyphenyl) hexafluoropropane dianhydride and 4,4'-diaminodiphenyl ether in dimethylacetamide under a nitrogen atmosphere at room temperature. The intermediate polyamic acid is converted to the corresponding polyimide by adding beta-picoline and acetic anhydride.

Fluorinated polyimides prepared as above do not have the desired properties in terms of molecular weight, color and other parameters required for many applications and thus further work has been done in this field. For instance, in U.S. Pat. No. 4,645,824 to Landis et al., there is disclosed and claimed a method of preparing high molecular weight fluorinated polyimides prepared by way of cresol solution. In the '824 patent, a method of preparing polyimides is described yielding polymers with molecular weights of up to about 35,000.

In copending U.S. application Ser. No. 217,929, filed in the USPTO on July 12, 1988, a process is described for synthesizing an ultra high molecular weight polyimide based on the condensation product of 2,2'-bis(3,4- di- carboxyphenyl) hexafluoro- propane dianhydride and 2,2'-bis(4-aminophenyl) hexafluoropropane or 2,2'-bis- (3-aminophenyl) hexafluoropropane. While these polymers exhibit superior mechanical, electrical and optical properties, they, like the polymers described in the aforementioned patents, have certain limitations particularly in applications relating to the microelectronics field.

A particularly desirable application for polyimide polymers is in microelectronic applications where polymer films having superior thermooxidative stability and good insulating properties are required. Such applications include dielectric interlayers and passivation coatings used in the production of electronic circuitry chips and semiconductor devices, including applications such as disclosed for example in U.S. Pat. No. 4,692,205. Such devices are normally prepared by forming a coating of a solution of polyimide on the surface of a silicon wafer by spin coating techniques, followed by the application of other photosensitive or processing layers. The method for processing such chips involves subjecting them to extremely high temperatures (at least 200° C.) as required for the etching and/or baking processes involved in the fabrication of such chips.

Ideally, the dry polyimide film which is spin coated onto the underlying substrate should be of uniform thickness, usually within the range of from about 25 to about 90 microns, preferably from about 35 to about 60 microns. The achievement of such uniform film thicknesses at given spin application rotation speeds is largely a function of the weight average molecular weight of the polyimide. Where relatively low molecular weight polymers are used, e.g., below about 50,000, the viscosity of the polymer solution employed in the spin coating process is very low such that films of uniform thickness above about 25 microns are difficult to achieve. The resulting thin films are relatively brittle and exhibit inferior mechanical and insulating properties. Where relatively high molecular weight polymers are used, e.g., above about 150,000, the viscosity of the coating solution will be very high and the solubility of the polymer relatively low. In such cases, the polymer solution will not flow uniformly on the surface of the silicone wafer giving rise to a striation-like uneven surface. When such a coated wafer is subjected to heat treatment, a stress is built up which may cause the film to lift from the surface of the wafer upon cooling.

In order to readily avoid the aforementioned pitfalls, it is most desirable that the average molecular weight (Mw) of the polyimide polymer be within the relatively narrow range of about 80,000 to about 135,000 in order to more readily produce a controllable dried coating thicknesses within the range of about 25 to about 90 microns, or more preferably within the range of about 35 to 60 microns.

To synthesize such a narrow molecular weight polymer, one could use the standard method described in the literature, such as end-capping the polymer chain to prevent further molecular weight build-up, as disclosed in U.S. Pat. No. 3,234,181. The end-capping compounds traditionally used are phthalic anhydride or aniline for condensation type polyimides. Controlled molecular weight polymers may be achieved by this technique, but at the expense of their thermal properties. End-capped polyimide polymers degrade rapidly at elevated temperatures during the stepwise baking process. Also, due to instability of the end-capping agent to moisture, the possibility of gelation of the coating solution over a period of time may exist. Coated films may also develop a dark amber color due to oxidative instability of the end-capping agents at elevated temperatures in air. These are a few of the many disadvantages of the end-capped polymer.

SUMMARY OF THE INVENTION

The present invention provides a process for producing polyamic acids and polyimides having a controllable molecular weight and molecular weight distribution without the need to utilize end-capping agents in the polymerization process and without the need to stoichiometrically vary monomer ratios. The process of this invention involves subjecting a mixture of aromatic dianhydride and aromatic diamine monomers, at least one of which contains the group

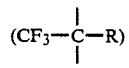

linking two aromatic moieties, wherein R is $CF_3$ or phenyl, to a low temperature, substantially isothermal solution polymerization process wherein the content of the mixed monomers in solvent is maintained within the range of from about 8 to about 12% by weight solids concentration during the polymerization process. The process is conducted for a sufficient length of time and uniformity of temperature, generally below about 35° C., to achieve a weight average polyimide polymer molecular weight within the range of about 80,000 to about 135,000, more preferably of about 90,000 to about 125,000, a polyimide inherent viscosity within the range of from about 0.45 to about 0.70, and a polydispersity with the range of from about 1.7 to about 2.6.

DETAILED DESCRIPTION OF THE INVENTION

The polyimides of the present invention may be characterized as comprised of recurring groups having the structure:

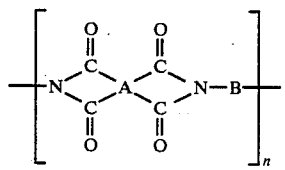

wherein the moiety A is a tetravalent aromatic radical containing at least one benzene, naphthalene or polyphenyl nucleus, the moiety B is a divalent aromatic group, and n is an integer ranging from about 100 to about 200, more preferably from about 120 to about 170. In order to achieve the desired solubility, thermal and radiation stability, electrical insulating properties, mechanical properties, and desired molecular weight, at least one of the moieties A or B, or both, is selected respectively from a tetravalent or divalent moiety of the formula:

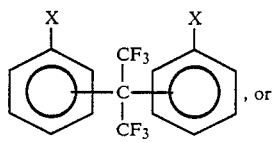

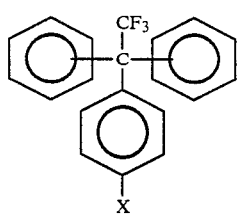

wherein x is a substituent independently selected from the group consisting of hydrogen, $C_1$ to $C_3$ alkyl, $C_1$ to $C_3$ alkoxy, halogen, hydroxy, $NO_2$, $HC=CH_2$ and $HC=CH$, A in formula 1 is a tetravalent radical wherein each pair of carbonyl groups are attached to adjacent carbon atoms in the ring moiety A, and more preferably A comprises a phenylene, naphthalene or bis-phenylene type compound, or mixture of such compounds, all of which may be unsubstituted or substituted on the aromatic rings with non-interfering halogen, hydroxy, $NO_2$, lower $C_1$ to $C_6$ alkyl, lower $C_1$ to $C_6$ alkoxy, $-CH=CH_2$ and $-CH=CH$ groups, and n is a number sufficient to provide a polyimide inherent viscosity within the range of about 0.45 to about 0.70 as measured from a solution of the polymer in dimethylacetamide at 25° C. at a polymer concentration of 0.5 weight percent. In the preferred embodiments of this invention, X is hydrogen.

The preferred polyamides according to the present invention are prepared by reacting an aromatic diamine and aromatic dianhydride wherein at least one of these monomers is selected from the group consisting of 2,2-bis(3,4-dicarboxyphenyl) hexafluoropropane dianhydride; 2,2-bis(3-aminophenyl) hexafluoropropane; 2,2-bis(4-aminophenyl) hexafluoropropane; 2-(3-aminophenyl)-2-(4-aminophenyl) hexafluoropropane, 2,2-hexafluoro-bis[4-(3-aminophenoxy) phenyl) propane; 2,2-hexafluoro-bis[4-(4-aminophenoxy) phenyl] propane; 1,1-bis-(4-aminophenyl)-1-phenyl-2,2,2-trifluoroethane; 1,-1-bis-[4-(1,2-dicarboxyphenyl)]-1-phenyl-2,2,2-trifluoroethane dianhydride and mixtures thereof.

The more preferred polyimides of the present invention are prepared by reacting 2,2-bis(3,4-dicarboxyphenyl) hexafluoropropane dianhydride (also referred to as 6FDA) with an aromatic diamine having the formula:

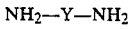

wherein Y is an aromatic moiety of a phenylene, naphthalene or bis-phenylene type compound which may be unsubstituted or ring substituted with non-interfering halogen, hydroxy, lower $C_1$ to $C_6$ alkyl or lower $C_1$ to $C_6$ alkoxy.

The most preferred polyimides of the present invention are prepared by reacting 6F-DA with a fluorine containing diaryl diamine such as 2,2-bis(3-aminophenyl) hexafluoropropane, 2,2-bis(4-aminophenyl) hexafluoropropane or 2-(3-aminophenyl)-2-(4-aminophenyl) hexafluoropropane to yield polyimides having recurring groups of the formula:

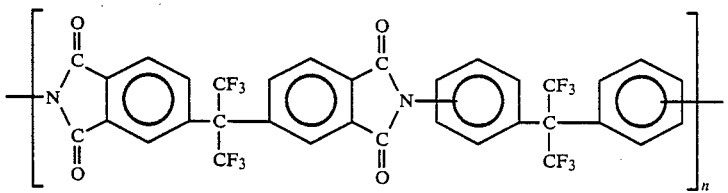

wherein n is as set forth above.

Illustrative of tetracarboxylic acid dianhydrides which are suitable for use in the present invention are:
1,2,4,5-benzene tetracarboxylic acid dianhydride;
1,2,3,4-benzene tetracarboxylic acid dianhydride;
1,4-bis(2,3-dicarboxyphenoxy) benzene dianhydride;
1,3-bis(3,4-dicarboxyphenoxy) benzene dianhydride;
1,2,4,5-naphthalene tetracarboxylic acid dianhydride;
1,2,5,6-naphthalene tetracarboxylic acid dianhydride;
1,4,5,8-naphthalene tetracarboxylic acid dianhydride;
2,3,6,7-naphthalene tetracarboxylic acid dianhydride;
2,6-dichloronaphthalene-1,4,5,8-tetracarboxylic acid dianhydride;
2,7-dichloronaphthalene-1,4,5,8-tetracarboxylic acid dianhydride;
2,3,6,7-tetrachloronaphthalene-1,4,5,8-tetracarboxylic acid dianhydride;
3,3′,4,4′-diphenyl tetracarboxylic acid dianhydride;
2,2′,3,3′-diphenyl tetracarboxylic acid dianhydride;
4,4′-bis(3,4-dicarboxyphenoxy)diphenyl dianhydride;
bis(2,3-dicarboxyphenyl) ether dianhydride;
4,4′-bis(2,3-dicarboxyphenoxy) diphenyl ether dianhydride;
4,4′-bis(3,4-dicarboxyphenoxy) diphenyl ether dianhydride;
bis(3,4-dicarboxyphenyl) sulfide dianhydride;
4,4′-bis(2,3-dicarboxyphenoxy) diphenyl sulfide dianhydride;
4,4′-bis(3,4-dicarboxyphenoxy) diphenyl sulfide dianhydride;
bis(3,4-dicarboxyphenyl) sulfone dianhydride;
4,4′-bis(2,3-dicarboxyphenoxy) diphenyl sulfone dianhydride;
4,4′-bis(3,4-dicarboxyphenoxy) diphenyl sulfone dianhydride;
3,3′,4,4′-benzophenone tetracarboxylic acid dianhydride;
2,2′,3,3′-benzophenone tetracarboxylic acid dianhydride;
2,3,3′4′-benzophenone tetracarboxylic acid dianhydride;
4,4′-bis(3,4-dicarboxyphenoxy) benzophenone dianhydride;
bis(2,3-dicarboxyphenyl) methane dianhydride;
bis(3,4-dicarboxyphenyl) methane dianhydride;
1,1-bis(2,3-dicarboxyphenyl) ethane dianhydride;
1,1-bis(3,4-dicarboxyphenyl) ethane dianhydride;
1,2-bis(3,4-dicarboxyphenyl) ethane dianhydride;
2,2-bis(2,3-dicarboxyphenyl) propane dianhydride;
2,2-bis(3,4-dicarboxyphenyl) propane dianhydride;
2,2-bis[4-(2,3-dicarboxyphenoxy) phenyl] propane dianhydride;
2,2-bis[4-(3,4-dicarboxyphenoxy) phenyl] propane dianhydride;
4-(2,3-dicarboxyphenoxy)-4′-(3,4-dicarboxyphenoxy) diphenyl-2,2-propane dianhydride;
2,2-bis[4-(3,4-dicarboxyphenoxy-3,5-dimethyl) phenyl] propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
1,8,9,10-phenanthrene tetracarboxylic acid dianhydride;
3,4,9,10-perylene tetracarboxylic acid dianhydride;
2,2-bis(3,4-dicarboxphenyl) hexafluoropropane dianhydride;
1,3-bis(3,4-dicarboxyphenyl) hexafluoropropane dianhydride;
1,1-bis(3,4-dicarboxyphenyl)-1-phenyl-2,2,2-trifluoroethane dianhydride;
2,2-bis[4-(3,4-dicarboxyphenoxy) phenyl] hexafluoropropane dianhydride;
1,1-bis[4-(3,4-dicarboxyphenoxy) phenyl]-1-phenyl-2,2,2-trifluoroethane dianhydride; and
4,4′-bis[2-(3,4-dicarboxyphenyl)hexafluoroisopropyl] diphenyl ether dianhydride.

Illustrative of diamines which are suitable for use in the present invention are:
m-phenylene diamine;
p-phenylene diamine;
1,3-bis(4-aminophenyl) propane;
2,2-bis(4-aminophenyl) propane;
4,4′-diamino-diphenyl methane;
1,2-bis(4-aminophenyl) ethane;
1,1-bis(4-aminophenyl) ethane;
2,2′-diamino-diethyl sulfide;
bis(4-aminophenyl) sulfide;
2,4′-diamino-diphenyl sulfide;
bis(3-aminophenyl)sulfone;
bis(4-aminophenyl) sulfone;
4,4′-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phenyl phosphine oxide;
bis(4-aminophenyl)-N-phenylamine;
bis(4-aminophenyl)-N-methylamine;
1,2-diamino-naphthalene;
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-methyl-naphthalene;
1,5-diamino-2-methyl-naphthalene;
1,3-diamino-2-phenyl-naphthalene;
4,4′-diamino-biphenyl;
3,3′-diamino-biphenyl;
3,3′-dichloro-4,4′-diamino-biphenyl;
3,3′-dimethyl-4,4′-diamino-biphenyl;
3,4′-dimethyl-4,4′-diamino-biphenyl;
3,3′-dimethoxy-4,4′-diamino-biphenyl;
4,4′-bis(4-aminophenoxy)-biphenyl;

2,4-diamino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene;
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;
p-xylylene diamine;
3,3'-diamino-benzophenone;
4,4'-diamino-benzophenone;
2,6-diamino-pyridine;
3,5-diamino-pyridine;
1,3-diamino-adamantane;
3,3'-diamino-1,1,1'-diadamantane;
N-(3-aminophenyl)-4-aminobenzamide;
4-aminophenyl-3-aminobenzoate;
2,2-bis(4-aminophenyl) hexafluoropropane;
2,2-bis(3-aminophenyl) hexafluoropropane;
2-(3-aminophenyl)-2-(4-aminophenyl) hexafluoropropane;
2,2-bis[4-(4-aminophenoxy)phenyl] hexafluoropropane;
2,2-bis[4-(2-chloro-4-aminophenoxy)phenyl hexafluoropropane;
1,1-bis(4-aminophenyl)-1-phenyl-2,2,2-trifluoroethane;
1,1-bis[4-(4-aminophenoxy)phenyl]-1-phenyl-2,2,2-trifluoroethane;
1,4-bis(3-aminophenyl)buta-1-ene-3-yne;
1,3-bis(3-aminophenyl) hexafluoropropane;
1,5-bis(3-aminophenyl) decafluoropentane; and mixtures thereof.

The dianhydride and diamine reactants, particularly those containing fluorine, are preferably substantially electronically pure and are referred to as electronic grade. They generally should be at least about 98.5% pure diamine or pure dianhydride.

As indicated above, the critical aspect of the present invention which yields polyamic acids and polyimides of controllable molecular weight without the need to resort to the use of undesirable end-capping materials, is to conduct the polymerization of the monomers in solvent at a monomer solids content of from about 8 to about 12%, and most preferably at about 10% monomer solids. At solids levels of below about 8%, it has been found that the molecular weight of the polyimide is lower than the ideal minimum Mw of about 80,000 to achieve relatively thick, non brittle spin coated films which are desired in microelectronic applications. At above about 12% monomer solids content, the resulting molecular weight of the polyimide is higher than the ideal maximum Mw of about 135,000, which leads to difficulties in spin coating a film which does not yield striations in the film, or films which will stress upon heating. For best results in spin coating processes, it is preferred that the Brookfield viscosity of a 25% solution of the polymer in a 70/30 by weight solvent mixture of butyrolactone and diglyme, to be spin coated on a substrate be within the range of from about 700 to about 1300 centipoise, more preferably from about 800 to about 1200 centipoise. It is difficult to achieve viscosities within this range with low molecular weight polymers without raising the concentration of the polymer in the spin coating solution which will effect both the thickness and mechanical properties of the dried spin coated film. Conversely, higher molecular weight polymers will yield spin coating solutions at 25% solids with Brookfield viscosities well above about 1300 centipoise and up to 2000 centipoise or more, which will give rise to spin coated dried films which have an uneven, striated surface. In order to provide smooth coatings, it would be necessary to dilute such high molecular weight solutions to such an extent that film thicknesses in excess of about 25 microns would be difficult to achieve.

Another advantage of the process of this invention is that it yields polymers having a very narrow polydispersity factor (d) within the range of about 1.7 to about 2.6. Polydispersity is determined by dividing the weight average molecular weight (Mw) of the polymer by the number average molecular weight (Mn) of the polymer. The narrower the polydispersity factor, the better the mechanical properties such as tensile strength, elongation, and tensile modulus, and the optical and electrical properties are enhanced as well.

Solvents which may be used in the polymerization process of this invention are organic solvents, preferably anhydrous, whose functional groups do not react with either the dianhydride or diamine reactant to any appreciable extent, and in which either the dianhydride or diamine, preferably both, are soluble. Examples of suitable solvents include N,N-dialkylcarboxylamide solvents such as N,N-dimethylformamide or N,N-dimethylacetamide; N-methyl-2-pyrrolidone; gammabutyrolactone; pyridine; diglyme; and like materials as well as mixtures of such solvents.

In the preferred process for preparing the polyimides of this invention, approximately equimolar quantities of the dianhydride and the diamine are employed. Preferably, the diamine is first dissolved in the polymerization solvent medium and the dianhydride is then gradually added portionwise under continuous agitation. After the addition of all of the monomer, the concentration of the reactants should be such that a solution concentration within the range of about 8 to about 12%, preferably about 10%, by weight is achieved. Additional solvent may be added if necessary to achieve this level. Polymerization is then conducted under anhydrous conditions while agitating the mixture maintained by a cooling bath at a temperature of less than about 35° C., preferably from about 20° C. to about 30° C. Polymerization is conducted for a time sufficient to form a polyamic acid having the desired molecular weight, usually a period of from about 8 to about 20 hours. The polyamic acid may then be converted to the polyimide by one of several techniques known in the art such as by heating the polyamic acid solution until imidization is substantially complete or by combining the polyamic acid solution and a dehydrating agent, with or without catalyst, and optionally heating the resulting mixture until imidization is substantially complete.

The polyimide may then be recovered from solution by precipitation with an alcohol such as methanol and washed with additional methanol.

The following examples are illustrative of the invention.

EXAMPLE 1

A three neck flask was fitted with a stirrer, condenser, ice water bath, thermometer and nitrogen atmosphere. To the flask, 33.40 g (0.1 mole) of electronic grade 2,2-bis(4-aminophenyl) hexafluoropropane (also referred to herein as 6F-Diamine) along with 500 grams of freshly distilled N-methyl pyrrolidone (NMP) was charged. The mixture was agitated for several minutes at room temperature to get a clear, slightly yellow, solution. The solution was then cooled to slightly below room temperature (about 17° C.) and 44.4 grams of electronic grade 2,2-bis(3,4-dicarboxyphenyl) hexafluoropropane dianhydride (also referred to herein as 6F-Dianhydride) was added portionwise in equal intervals and amounts over a period of about fifteen minutes. The addition of anhydride must be carefully executed while the reaction mixture is agitated gently so that the solution is maintained between 25° and 30° C. After 6F-Dianhydride addition, the beakers containing the monomers were washed with an additional 200 grams of NMP and the NMP and residual monomer was added to the reaction mixture to obtain a solution of ten percent non volatile concentration. The mixture, maintained at between at a uniform temperature between about 25° and 30° C. was agitated gently for about 19 hours after which a sample of the polyamic acid formed was withdrawn for viscosity analysis. To the polymerized mixture, 9.6 grams of beta-picoline was added and fully dispersed. After the addition of beta picoline, 96.0 grams of acetic anhydride was subsequently added dropwise and the mixture was agitated gently for an additional twenty-two hours (also at 25°–30° C., uniform temperature) to complete cyclization. The above process, and those described below, were all carried out in a dry nitrogen atmosphere and reactants were all added in portions so that undesirable effects were avoided. Likewise, it is important to keep the temperature of the reaction mixture suitably uniform in all steps; for example, if the temperature is allowed to elevate locally, even during cyclization, the reaction mixture may gel and not form suitable polymer.

The polymer formed as above was precipitated from solution in methanol by the addition of methanol to the reaction liquor, that is by reverse precipitation, using 2000 ml of methanol for every 500 g of polymeric solution. The resulting polymer was then washed with additional fresh methanol. Properties of the polymer (after drying) and polyamic acid appear in Table 1.

EXAMPLE 2

The procedure of Example 1 was repeated, except that the following materials were used:
- 183.7 grams (0.55 mole) of 6F-Diamine
- 244.2 grams (0.55 mole) of 6F-Dianhydride
- 3852 grams freshly distilled NMP
- 550.0 grams acetic anhydride
- 55.0 grams beta-picoline.

Reaction times and temperatures (approximate) appear below:

| Reactant mixing in 1500 g NMP: | 20 minutes |
| --- | --- |
| Polymerization time at 10 percent monomer concentration: | 20 hours |
| Polymerization temperature: | 20–25° C. |
| Cyclization time: | 20 hours |
| Cyclization temperature: | 25–30° C. |

Properties of the polymer (after drying) and intermediate polyamic acid appear in Table 1.

EXAMPLE 3

The procedure of Example 1 was repeated, except that the following materials were used:
- 33.4 grams (0.1 moles) of 6F-Diamine
- 44.4 grams (0.1 moles) of 6F-Dianhydride
- 700 grams freshly distilled NMP
- 96.2 grams acetic anhydride
- 9.6 grams beta picoline Reaction times and temperatures are given below:

| Reactant mixing in NMP: | 23 minutes |
| --- | --- |
| Polymerization time at 10 percent concentration: | 18 hours |
| Polymerization temperature: | 20–25° C. |
| Cyclization time: | 23 hours |
| Cyclization temperature: | 25–30° C. |

Properties of the polymer (after drying) and intermediate polyamic acid appear in Table 1.

As indicated above, a critical aspect of the present invention for controlling and achieving the desired molecular weight properties of the polyimide is to conduct the polymerization at a monomer concentration in organic solvent of from about 8 to about 12% by weight. In Examples 1–3, the polymerization was carried out at a monomer/solvent concentration of about 10% by weight. The following comparative examples illustrate polymer properties achieved when the polymerization is carried out at monomer concentrations outside of this range.

COMPARATIVE EXAMPLE 4

The procedure of Example 1 was repeated. In this case, however, the amount of NMP solvent employed during the polymerization was such that the monomer concentration was about 5% by weight. The following materials were used:
- 33.4 grams (0.1 mole) of 6F-Diamine
- 44.4 grams (0.1 mole) of 6F-Dianhydride
- 1478.0 grams of freshly distilled NMP
- 98.0 grams of acetic anhydride
- 9.8 grams of beta picoline Reaction times and temperatures are given below:

| Reactant mixing in 1000 g NMP: | 20 minutes |
| --- | --- |
| Polymerization time at 5 percent concentration: | 18 hours |
| Polymerization temperature: | 20–25° C. |
| Cyclization time: | 21 hours |
| Cyclization temperature: | 25–30° C. |

Properties of the polymer (after drying) and intermediate polyamic acid appear in Table 1.

COMPARATIVE EXAMPLE 5

The procedure of Example 1 was repeated. In this case, however, the amount of NMP solvent employed during the polymerization was such that the monomer concentration was about 15% by weight. The following materials were used:
- 33.4 grams (0.1 mole) of 6F-Diamine
- 44.4 grams (0.1 mole) of 6F-Dianhydride
- 440.9 grams of freshly distilled NMP
- 94.3 grams acetic anhydride
- 9.4 grams beta picoline Reaction times and temperatures are given below:

| Reactant mixing in 300 g NMP: | 24 minutes |
| --- | --- |
| Polymerization time at 15 percent concentration: | 18 hours |
| Polymerization temperature: | 20–25° C. |
| Cyclization time: | 22 hours |
| Cyclization temperature: | 25–30° C. |

-continued

| concentration: | |
| --- | --- |
| Polymerization temperature: | 20–25° C. |
| Cyclization time: | 22 hours |
| Cyclization temperature: | 25–30° C. |

Properties of the polymer (after drying) and intermediate polyamic acid appear in Table 1.

TABLE 1

| Example | Reaction Scale Mole 6FDA/4,4'6FDIAM (% Solids Conc.) | Inherent Viscosity At 25 deg. C. (dl/gm) | | GPC | | d ($M_w/M_n$) | DSC Tg. deg. C. | TGA 5% Wt. Lo deg. C. |
| --- | --- | --- | --- | --- | --- | --- | --- | --- |
| | | Polyamic Acid | Polyimide | $M_w$ | $M_n$ | | | |
| 1 | 0.1/0.1 (10% sol.) | 0.69 | 0.52 | 103600 | 54600 | 1.9 | 323 | 525 |
| 2 | 0.55/0.55 (10% sol.) | 0.63 | 0.65 | 121400 | 56600 | 2.1 | 323 | 515 |
| 3 | 0.1/0.1 (10% sol.) | 0.74 | 0.62 | 118900 | 58000 | 2.1 | 321 | 520 |
| 4 | 0.1/0.1 (5% sol.) | 0.36 | 0.29 | 58300 | 28500 | 2.1 | 317 | 510 |
| 5 | 0.1/0.1 (15% sol.) | 0.89 | 0.77 | 181900 | 98800 | 1.9 | 320 | 520 |
| 6 | 0.4/0.4 (15% sol.) | 1.09 | 0.95 | 209000 | 96400 | 2.2 | 322 | 525 |
| 7 | 0.8/0.8 (20% sol.) | 1.14 | 1.00 | 243000 | 135000 | 1.8 | 323 | 525 |

Properties of the polymer (after drying) and intermediate polyamic acid appear in Table 1.

COMPARATIVE EXAMPLE 6

The procedure of Example 1 was repeated. In this case, however, the amount of NMP solvent employed during the polymerization was such that the monomer concentration was about 18% by weight. The following materials were used:

133.6 grams (0.4 mole) of 6F-Diamine
177.6 grams (0.4 mole) of 6F-Dianhydride
1481.0 grams of freshly distilled NMP
393.5 grams of acetic anhydride
39.4 grams of beta picoline Reaction times and temperatures are given below:

| Reactant mixing in NMP: | 20 minutes |
| --- | --- |
| Polymerization time at 18 percent concentration: | 19 hours |
| Polymerization temperature: | 20–25° C. |
| Cyclization time: | 21 hours |
| Cyclization temperature: | 25–30° C. |

Propeties of the polymer (after drying) and intermediate polyamic acid appear in Table 1.

COMPARATIVE EXAMPLE 7

The procedure of Example 1 was repeated. In this case, however, the amount of NMP solvent employed during the polymerization was such that the monomer concentration was about 20% by weight. The following materials were used:

267.0 grams (0.8 mole) of 6F-Diamine
355.0 grams (0.8 mole) of 6F-Dianhydride
2490.0 grams of freshly distilled NMP
795.0 grams acetic anhydride
79.5 grams of beta picoline Reaction times and temperatures are given below:

| Reactant mixing in NMP: | 20 minutes |
| --- | --- |
| Polymerization time at 20 percent | 15½ hours |

The molecular weight of the polymers, whether weight average molecular weight ($M_w$), or number average molecular weight ($M_n$), were measured by gel permeation chromatography (GPC) performed on dilute solutions of the polymer in tetrahydrofuran (THF). The actual apparatus employed consisted of a Waters (Millipore Corporation) programmable automatic sampler, vacuum pump, chromatography columns with heater, and a differential refractometer connected to a Shimadzu CR 30A data reduction system with accompanying software (version 1.1, Shimadzu part No. T/N 22301309-91). The refractometer used was a Waters model 410 and four chromatography columns, 500 Angstron, 1000 Angstron, 10,000 Angstron and 100,000 Angstron (available from Waters) were connected in series. The system was calibrated using multiple available polystyrene standards ranging in molecular weight as follows:

| GPC Calibration Standard (Polystyrene) | Mol. Wt. |
| --- | --- |
| 1 | 470,000 |
| 2 | 170,000 |
| 3 | 68,000 |
| 4 | 34,500 |
| 5 | 9,200 |
| 6 | 3,200 |
| 7 | 1,250 |

The standards are essentially monodisperse, consisting substantially of a single molecular weight. With the system thus calibrated the weight average molecular weight $M_w$, the number average molecular weight $M_n$, and polydispersity (d), $M_w/M_n$ were obtained for polymers produced in accordance with the Examples given hereinabove.

Glass transition temperatures (Tg) were determined by differential scanning calorimetry using a Perkin Elmer DSC-4 calorimeter operating at 20° C./min, nitrogen atmosphere at 60 cc/min. Glass transition temperature by this method is generally defined as the point of intersection of tangent lines about the point of first inflection of the heating curve of the polymer. Thermogravimetric analysis (TGA) was performed with a Perkin Elmer 65-2 analyzer at 20° C./min with an air rate of 80 cc/min. TGA values given herein are for five percent weight loss; in other words, the temperature at which 5% weight loss is observed is reported.

As is evident from the data in Table 1, polyimides having a weight average molecular weight within the target range of about 80,000 to about 135,000 are obtained by the process of this invention. Varying the monomer concentration below about 8%, as in Example 4, or increasing the monomer concentration above about 12%, as in Examples 5-7, gives rise to polyimide polymers having a weight average molecular weight respectively below or above the target range.

The polyimides of the present invention are ideally suited for use as dielectric interlayers and passivation coatings in the production of chips and semiconductor devices. Solutions of the polyimides may be spun coated onto suitable substrates such as silicon wafers to form uniform plannerized films after evaporation of the solvent, said films having a thickness within the range of from about 25 to 90 microns.

As indicated above, the molecular weight of the polyimides of this invention is such as to yield Brookfield viscosities within the range of about 700 to about 1300 centipoise measured as a 25% by weight polymer solids solution in a solvent mixture of 70/30 by weight butyrolactone/diglyme at room temperature using a Brookfield viscometer, Model LVT, Spindle LV #3. A 25% by weight solution of the same polymer will give rise to spin coating solutions having different apparent viscosities depending on the solvent system employed. For example, a 25% by weight solution of the polyimide of Example 1 exhibits an average Brookfield viscosity of about 918 cps in 70/30 butyrolactone/diglyme, 1073 cps in 50/50 butyrolactone/propylene glycol methyl ether acetate, 854 cps in 70/30 diglyme/tetrahydrofuran, and 2483 cps in 100% N-methyl pyrrolidone. Accordingly, best spin coating results are achieved by selecting spin coating solvents which will give rise to Brookfield viscosities within the preferred 700 to 1300 centipoise range.

The following example illustrates the preparation of a spin-coated silicon wafer.

EXAMPLE 8

The polyimide polymer of Example 1 was dissolved in a 50/50 solvent mixture of butylrolactone and propylene glycol methyl ether acetate to form a solution containing 25% by weight polymer. This solution had an average Brookfield viscosity of 1073 centipoise as measured at room temperature on a Brookfield viscomiter using an LV-3 probe. A coating of this polymer solution was applied to a 3 inch cleaned silicon wafer using a spin coating technique. The coating was dispensed at the center of the wafer at rest so that about 30% of the surface area was covered. The wafer was then spun at about 1,000 rpm for about 30 seconds. The coated wafer was step-wise baked to remove the solvent at 90° C. for 15 min., at 160° C. for 15 min., at 250° C. for 15 min., and finally at 350° C. for 2 hours. After cooking it was observed that a uniform, non-striated coating surface had been obtained. The thickness of the polymer coating was about 30 microns.

EXAMPLE 9

Molded discs based on polyimides of Examples 3 and 6 were prepared as follows: Powdered samples of the polymers were screened and dried in a vacuum oven at 200° C. Approximately 10 gram samples of the polymer were evenly spread in the cavity of a 3" diameter mold previously heated to 200° C. The plunger was then placed in the mold cavity and pressure was applied to the mold by means of a hydraulic press with heated platens. The temperature of the mold was gradually heated from 200° C. to 350° C. while increasing the pressure on the mold from 1000 to 5000 psi over a period of about 3 hours. The mold was then cooled and the cooled polymer disc removed from the mold. In the case of the polymer of Example 3 it was observed that the polymer began to flow out of the mold crevaces at about 320° C. (at approximately its glass transition temperature) and at a pressure of about 2500 psi. In the case of the polymer of Example 6, a similar flow was not observed until a temperature of about 345° C. was obtained and at a pressure of about 4500 psi.

This is indicative of the fact that the polymers of this invention having a relatively narrow intermediate molecular weight are readily hot processable at relatively low temperatures in the order of 300° to 320° C. and pressures of 2500 to 3000 psi as compared to the higher molecular weight counterpart polymers which require temperatures of about 350° C. and pressures of about 5000 psi for heat processability.

The polyimides of this invention exhibit good solubility properties in solvents such as N-methyl pyrrolidone (NMP), dimethyl acetamide (DMAc), diglyme, methylethylketone (MEK), tetrahydrofuran (THF), acetone, chloroform, butyrolactone (BLO), dimethylsulfoxide (DMS), dimethylformamide (DMF), propylene glycol methyl ether (PGME), and the like.

The polyimides of this invention also exhibit improved thermal flow properties and may be melt spun to form fibers and filaments. Because of their good solubility in common organic solvents, films may be cast from solvent solutions. Such films may be used as printed circuit backings, insulating dielectric interlayers and other applications where tough, high temperature stable films having good dielectric properties have been used in the past.

The polyimides of this invention may be molded using standard techniques such as compression molding or injection molding to produce melt fabricated articles such as fibers, films, safety masks, windshields, electronic circuit substrates, airplane windows or the like. They may be compounded with graphite, graphite fiber, molybdenum disulphide or PTFE for the production of self-lubricating wear surfaces useful for piston rings, valve seats, bearings and seals. They may also be compounded with fibers such as glass, graphite or boron fibers to produce molding compounds for high strength structural components such as jet engine components. The polyimides may also be compounded with friction materials to produce molding compounds for high temperature braking components or with abrasive materials such as diamonds for high speed grinding wheels.

The polyimides may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and photoresist coatings useful in microelectronic processing.

The polyimides may also be used to produce high temperature adhesives for bonding aerospace structures or electrical circuitry, conductive adhesives when mixed with conductive fillers such as silver or gold for microelectronic applications, or adhesives for glass, metal or plastic substrates.

The polyimides may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

In general, the polyimides and polyamide-acid precursors of this invention may be used in all applications as disclosed in copending application Ser. No. 124,704, filed in the U.S. Patent and Trademark Office on November 24, 1987, the disclosure of which application is incorporated herein by reference.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A process for producing a shaped article of a polyimide polymer comprising heating said polymer to a temperature of at least about 300° C. while subjecting said polymer to a pressure of at least about 2500 psi sufficient to form a shaped article, and cooling said shaped article, said polyimide polymer having recurring groups of the structure:

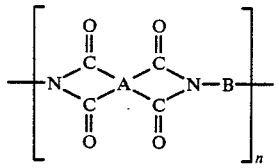

wherein A is a tetravalent aromatic radical group selected from the group consisting of at least one benzene, naphthalene and poly-phenyl nucleus, B is a divalent aromatic group, and n is an integer ranging from about 100 to about 200, said polyimide polymer prepared by a process comprising:
(a) forming a dispersion of an approximately equimolar mixture of an aromatic diamine monomer and an aromatic dianhydride monomer in organic solvent at a total monomer solids concentration within a range of from about 8 to about 12% by weight, at least one of said monomers containing a

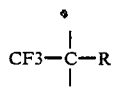

group linking two aromatic moieties, wherein R is selected from the group consisting of CF$_3$ and phenyl;
(b) subjecting said monomer mixture to isothermal polymerization conditions to form a polyamic acid; and
(c) cyclizing said polyamic acid to form a polyimide;
said polymerization step being of sufficient length of time and uniformity of temeprature to achieve a polyimide weight average molecular weight (Mw) within the range of about 8,000 to about 135,000.

2. The process of claim 1 wherein R is —CF$_3$.

3. The process of claim 2 wherein said polymerization process is conducted free of the presence of a monomer end capping agent.

4. The process of claim 1 wherein at least one of said aromatic diamine monomers and said aromatic dianhydride monomers is selected from the group consisting of 2,2-bis(3,4-dicarboxyphenyl) hexafluoro-propane dianhydride; 2,2-bis(3-aminophenyl) hexafluoro-propane; 2,2-bis(4-aminophenyl) hexafluoropropane; 2-(3-aminophenyl)-2-(4-aminophenyl) hexafluoropropane, 2,2-hexafluoro-bis[4-(3-aminophenoxy) phenyl] propane; 2,2-hexafluoro-bis[4-(4-aminophenoxy) phenyl] propane; 1,1-bis-(4-aminophenyl)-1-phenyl-2,2, 2-trifluoro-ethane; 1,1-bis-[4-(1,2-dicarboxyphenyl)]-1-phenyl-2,2,2-trifluoro-ethane dianhydride and mixtures thereof.

5. The process of claim 4 wherein said aromatic dianhydride monomer is 2,2-bis(3,4-dicarboxy-phenyl) hexafluoropropane dianhydride.

6. The process of claim 5 wherein said aromatic diamine is selected from the group consisting of 2,2-bis(3-aminophenyl) hexafluoropropane, 2,2-bis-(4-aminophenyl) hexafluoropropane.

7. The process of claim 6 wherein said aromatic diamine is 2,2-bis-(4-aminophenyl) hexafluoropropane.

8. The process of claim 2 wherein said polyimide polymer has an inherent viscosity within a range of from about 0.45 to about 0.70 as measured from a solution of the polymer in dimethylacetamide at 25° C. at a polymer concentration of 0.5 weight percent.

9. The process of claim 2 wherein said monomers are dispersed in solvent at a concentration of about 10% by weight.

10. The process of claim 2 wherein the weight average molecular weight of said polyimide polymer is within the range of about 90,000 to about 125,000.

11. The process of claims 1 or 2 wherein said shaped article is prepared by a compression molding process.

12. The process of claim 1 wherein said monomers containing the

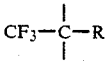

group are selected from:

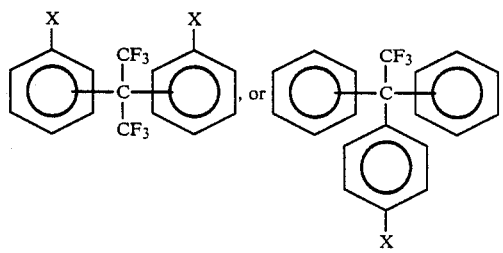

wherein x is a substituent independently selected from the group consisting of hydrogen, $C_1$ to $C_3$ alkyl, $C_1$ to $C_3$ alkoxy, halogen, hydroxy, $NO_2$, $HC=CH_2$ and $HC\equiv CH$.

13. The process of claim 2 wherein said polyimide polymer has a polydispersity factor (Mw/Mn) within the range of from about 1.7 to about 2.6.

* * * * *

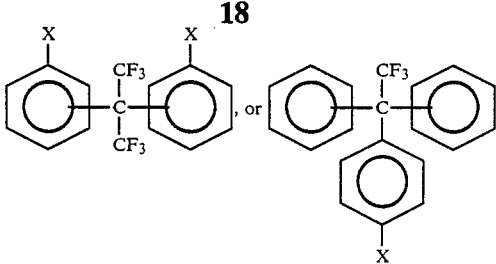

wherein x is a substituent independently selected from the group consisting of hydrogen, $C_1$ to $C_3$ alkyl, $C_1$ to $C_3$ alkoxy, halogen, hydroxy, $NO_2$, $HC=CH_2$ and $HC\equiv CH$.

13. The process of claim 2 wherein said polyimide polymer has a polydispersity factor (Mw/Mn) within the range of from about 1.7 to about 2.6.

* * * * *